United States Patent
Chang et al.

(10) Patent No.: US 7,334,854 B1
(45) Date of Patent: Feb. 26, 2008

(54) SENSORLESS START-UP METHOD FOR DRIVING A BRUSHLESS DC MOTOR

(75) Inventors: Yen-Chuan Chang, Hsinchu (TW); Ying-Yu Tzou, Hsinchu (TW)

(73) Assignee: Aimtron Technology Corp., Hsinchu (TW)

( * ) Notice: Subject to any disclaimer, the term of this patent is extended or adjusted under 35 U.S.C. 154(b) by 0 days.

(21) Appl. No.: 11/533,372

(22) Filed: Sep. 20, 2006

(51) Int. Cl.
*H02P 6/18* (2006.01)

(52) U.S. Cl. .................. 319/439; 318/254; 318/430; 318/722

(58) Field of Classification Search ................ 318/138, 318/254, 439, 720–724, 430
See application file for complete search history.

(56) References Cited

U.S. PATENT DOCUMENTS

| | | | | |
|---|---|---|---|---|
| 5,001,405 A | * | 3/1991 | Cassat | 318/254 |
| 5,028,852 A | * | 7/1991 | Dunfield | 318/254 |
| 5,455,885 A | * | 10/1995 | Cameron | 388/834 |
| 5,530,326 A | * | 6/1996 | Galvin et al. | 318/254 |
| 6,570,353 B2 | * | 5/2003 | Krotsch et al. | 318/439 |
| 6,946,808 B2 | | 9/2005 | Kandori | |
| 7,071,640 B2 | | 7/2006 | Kurosawa et al. | |

OTHER PUBLICATIONS

Peter B. Schmidt et al, "Initial Rotor Angle Detection Of A Non-Salient Polo Permanent Magnet Synchronous Machine" IEEE-IAS Annual Meeting, Oct. 5-9, 1997, pp. 459-463.

* cited by examiner

*Primary Examiner*—Bentsu Ro
(74) *Attorney, Agent, or Firm*—Winston Hsu

(57) ABSTRACT

At first, a plurality of detection modes are applied in sequence to a brushless DC motor, such that with respect to each of the detection modes a composite magnetic field generated by a motor current flowing through motor coils points in a different direction. Then, each of peak values of the motor currents generated by the detection modes is compared with respect to one another so as to select, from the plurality of detection modes, one detection mode which generates a largest one of the peak values of the motor currents. An initial position of a rotor is determined on a basis of a direction of a composite magnetic field generated by the detection mode which generates the largest one of the peak values of the motor currents. Based on the initial position of the rotor, the brushless DC motor is driven to start rotating.

4 Claims, 7 Drawing Sheets

SENSORLESS START-UP METHOD FOR DRIVING A BRUSHLESS DC MOTOR

BACKGROUND OF THE INVENTION

1. Field of the Invention

The present invention relates to a sensorless start-up method for driving a brushless DC motor.

2. Description of the Related Art

Along with the advancement of technology, motors play a more and more important role in everybody's daily life, such as spindle motors of disc players, drive motors of image scanners, motors in toys, and motors of windscreen wipers. Due to the lack of commutating brushes, permanent magnet brushless DC motors is easier to be taken care of and has a smaller size, a higher efficiency, and other advantages, all of which render the brushless DC motors widely applied in many areas.

A conventional method for driving the permanent magnet brushless DC motor is to detect the position and rotating rate of a rotor through the use of Hall sensors in order to effectively perform the control on the position and rotating rate. However, the Hall sensors tend to be influenced by the operational environment, which adversely reduces the accuracy of detection. For this reason, a sensorless driving method is introduced into the mainstream of technological development. With respect to the sensorless driving method, the position of the rotor is detected on the basis of BEMF (back electromotive force). However, BEMF becomes almost zero when the rotor is static or at a very low rate of rotation, resulting in the impossibility of detecting the rotor's position. Therefore, one of the most important issues is how to accurately and stably start driving the motor by the sensorless method.

Among the proposed start-up methods, the open-loop control is the most widely employed. Three tri-phase sinusoidal waves, each of which has an increasing frequency, are directly applied to three phase coils of the motor so as to raise the rate of rotation of the motor. However, the start-up process may fail since the largest torque may not be generated upon the start-up due to the lack of knowledge about the rotor's position. In order to avoid such failure of start-up, the stator's coils may at first be energized for aligning the rotor in a predetermined direction, and then the open-loop control is executed. Nonetheless, the energization of the stator's coils may cause the rotor to reversely rotate, causing limitations to the applicable range. Moreover, the third method is to firstly detect the initial position of the rotor, and then starts driving the motor by the open-loop control in accordance with the rotor's initial position, thereby avoiding the failure of the start-up and reverse rotation.

Many techniques have been proposed to detect the initial position of the rotor in accordance with a functional relationship between the coil inductance and the rotor's position. Unfortunately, these techniques require either complicated algorithms or the feedback of tri-phase voltages and currents. In U.S. Pat. No. 6,946,808, entitled "Motor Drive Control Circuit And Motor Drive Apparatus," the rotor's initial position is detected by way of firstly applying a set of detection signals and then determining the rotor's initial position in accordance with responses of a common-terminal voltage of the stator's coils. Such a technique has an advantage of being easily carried out by using analog circuitry. However, it is difficult to retrieve the common-terminal voltage because the common terminal of the stator's coils is not qualified as a standard input/output interface of the motor structure.

SUMMARY OF THE INVENTION

Regarding with the open-loop control for driving the motor, it is unnecessary to 100%-precisely locate the initial position of the rotor, and a range covering several tens of degrees of electrical angle should be accurate enough for the open-loop start-up control. Therefore, the present invention provides a sensorless start-up method for driving a brushless motor, which has advantages of using simple steps with a low cost by detecting the rotor's initial position in accordance with peak values of motor currents, without the requirement of positional sensors and complicated algorithms. In one preferred embodiment, the resolution of detecting the rotor's initial position may achieve 30 degrees of electrical angle. The method according to the present invention detects the rotor's position before starting of the motor, i.e., the rotor is prevented from rotating during the detection period. The method according to the present invention overcomes the failure of start-up and reverse rotation occurred in the conventional methods.

According to one aspect of the present invention, a sensorless start-up method is provided for driving a brushless motor, including an initial position detection phase, an open-loop control phase, and a close-loop control phase. The initial position detection phase is used for detecting an initial position of a rotor. The rotor is kept at a rate of rotation of zero during the initial position detection phase. The open-loop control phase is used for driving the rotor in accordance with the initial position of the rotor such that the rate of rotation of the rotor gradually increases to reach a predetermined threshold rate. The close-loop control phase is used for driving the rotor such that the rate of rotation of the rotor increases from the predetermined threshold rate to reach a target rate.

The initial position detection phase includes three steps. The first step is performing a plurality of detection modes in sequence, such that with respect to each of the detection modes a composite magnetic field generated by a motor current flowing through motor coils points in a different direction. Each mode is performed to last for a corresponding detection time such that the motor current gradually increases to a peak value at an end of the corresponding detection time. The second step is comparing each of the peak values of the motor currents generated by the detection modes with respect to one another so as to select, from the plurality of detection modes, one detection mode which generates a largest one of the peak values of the motor currents. The third step is determining an initial position of a rotor on a basis of a direction of a composite magnetic field generated by the detection mode which generates the largest one of the peak values of the motor currents.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 1:
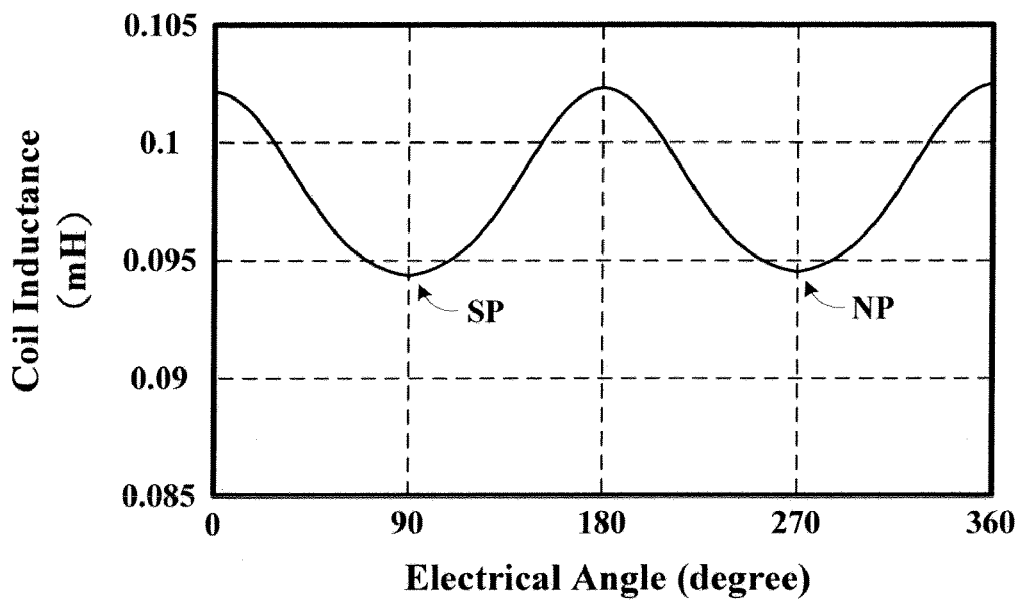
FIG. 1 is a chart showing a functional relationship between the coil inductance and the rotor's electrical angle when the motor current is zero.

In a permanent magnet brushless DC motor, a rotor is made of a permanent magnet and a stator is made of coils. Subjected to the influence of magnetic poles of the permanent magnet, the inductance of the stator's coil is not fixed, but a function of an electrical angle of the rotor. FIG. 1 is a chart showing a functional relationship between the coil inductance and the rotor's electrical angle when the motor current is zero. When the coil is aligned in parallel with either the north pole (NP) or the south pole (SP) of the permanent magnet, the coil is subjected to magnetic saturation, causing a reduction of the coil inductance.

Figure 2:
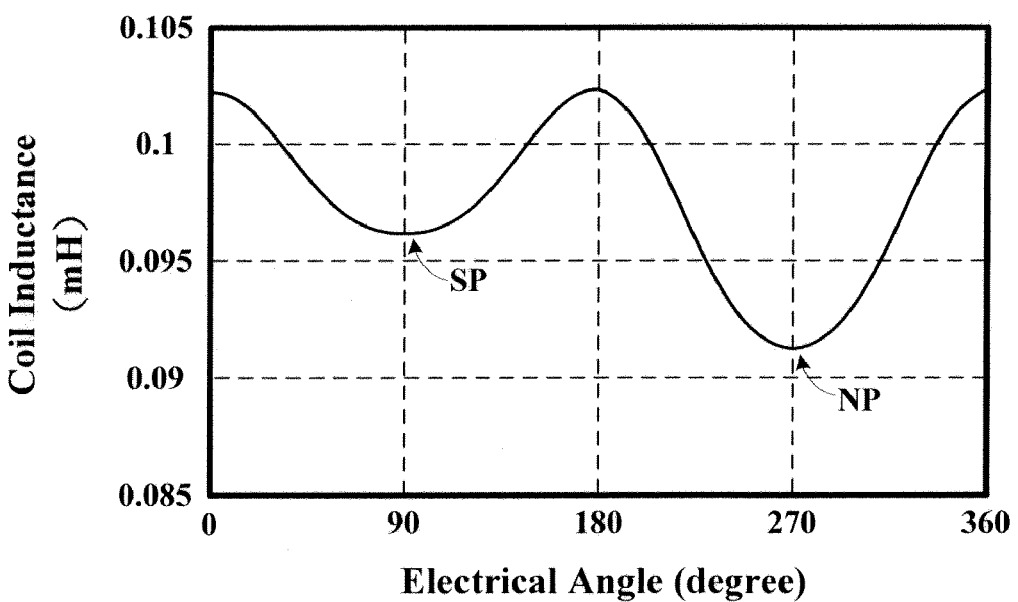
FIG. 2 is a chart showing a functional relationship between the coil inductance and the rotor's electrical angle when the motor current exists.

As soon as a current flows through the coil, a magnetic field is induced by the coil. In this case, the functional relationship between the coil inductance and the rotor's electrical angle is affected due to the magnetic interaction between the coil's magnetic field and the permanent magnet's field. FIG. 2 is a chart showing a functional relationship between the coil inductance and the rotor's electrical angle when the motor current exists. When the current is applied to the coil such that the magnetic field generated by the coil has the south pole aligned with respect to the south pole of the permanent magnet, the coil inductance becomes larger than the case where no current is applied because the magnetic saturation is relaxed due to the opposite directions of the two magnetic fields. When the current is applied to the coil such that the magnetic field generated by the coil has the south pole aligned with respect to the north pole of the permanent magnet, the coil inductance becomes smaller than the case where no current is applied because the magnetic saturation is enhanced due to the same direction of the two magnetic fields.

Figure 3:
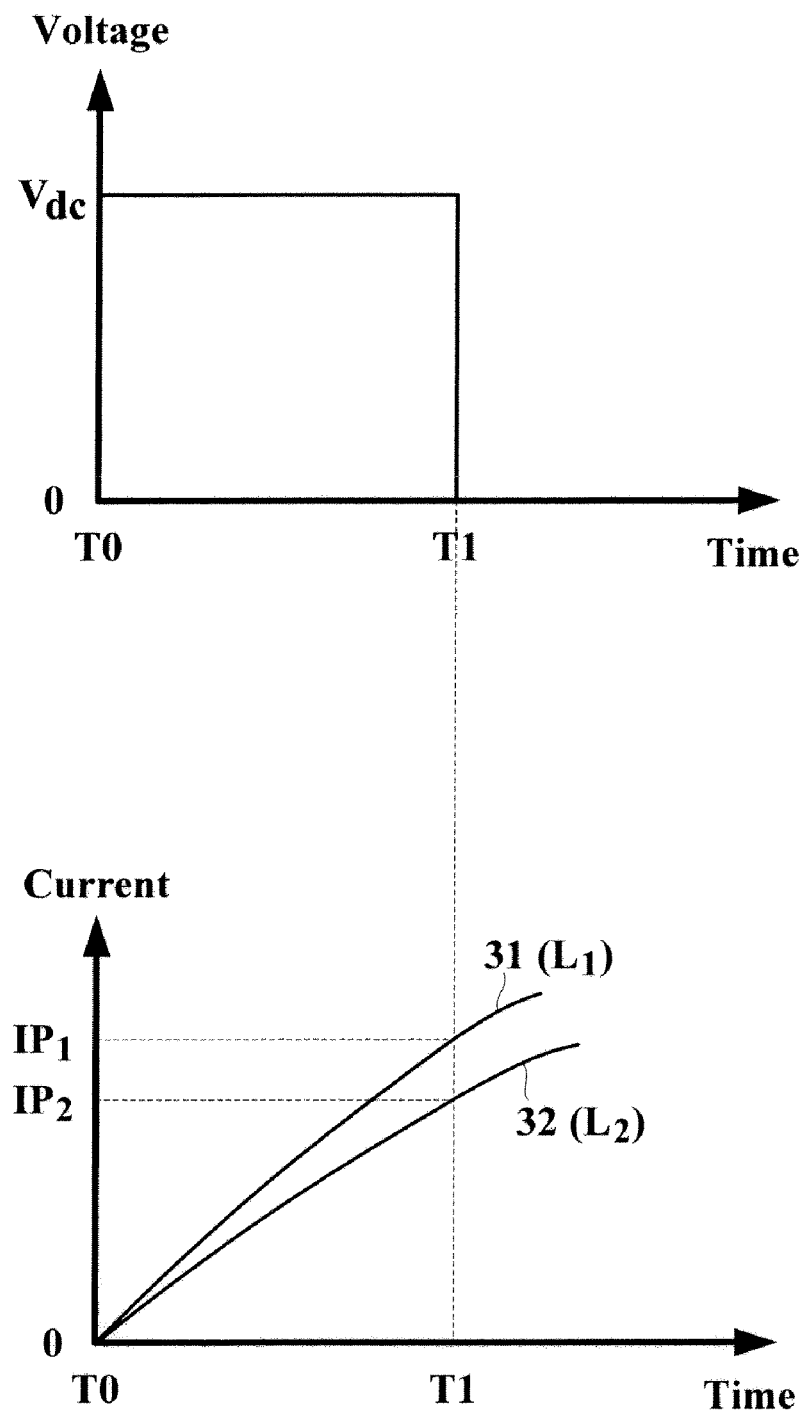
FIG. 3 is a chart showing respective currents of two different inductances in response to the same DC voltage.

The motor coil may be considered equivalent to a combination of a resistor, an inductor, and a BEMF, which are coupled together in series. When the motor is static, the BEMF is zero. If a DC voltage is applied to the motor coil, a gradually-increasing coil current is generated. Different coil inductances cause different increasing rates of coil current. In other words, a smaller coil inductance results in a larger increasing rate of coil current. FIG. 3 is a chart showing the respective currents of two different inductances in response to the same DC voltage. Referring to FIG. 3, it is assumed that a DC voltage $V_{dc}$ is applied to each of inductors $L_1$ and $L_2$ from time T0 to T1. If the inductor $L_1$ is smaller than the inductor $L_2$, a current response 31 of the inductor $L_1$ has a larger slope and a current response 32 of the inductor $L_2$ has a smaller slope. Therefore, at time T1, a current peak $IP_1$ flowing through the inductor $L_1$ is larger than a current peak $IP_2$ flowing through the inductor $L_2$.

Figure 4:
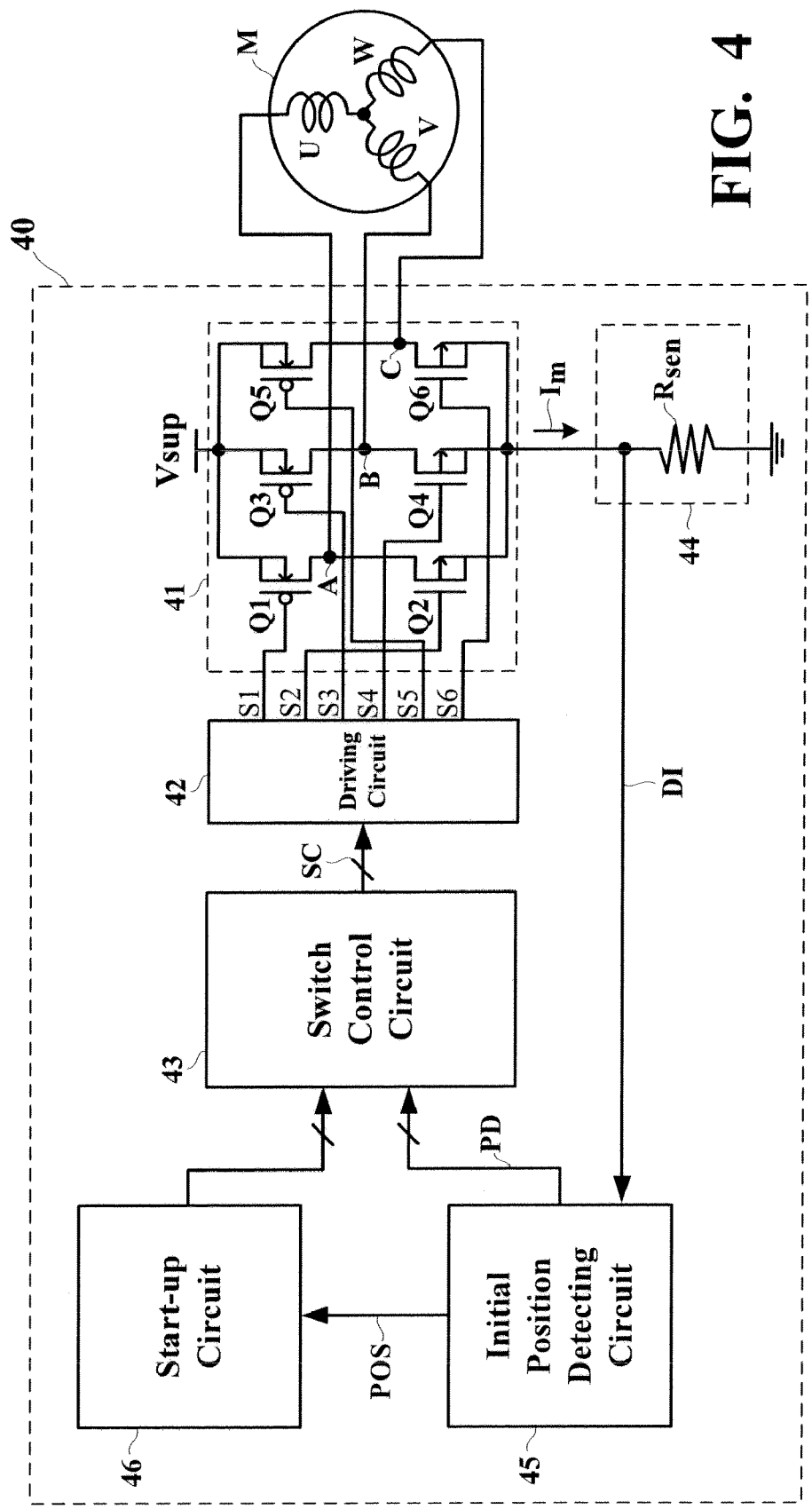
FIG. 4 is a circuit diagram showing a sensorless start-up control circuit for driving a brushless DC motor according to the present invention.

FIG. 4 is a circuit diagram showing a sensorless start-up control circuit 40 for driving a brushless DC motor M according to the present invention. Referring to FIG. 4, the sensorless start-up control circuit 40 includes a switching circuit 41, a driving circuit 42, a switch control circuit 43, a current detecting circuit 44, an initial position detecting circuit 45, and a start-up circuit 46. The initial position detecting circuit 45 applies in sequence twelve sets of initial position detecting signals PD to the switch control circuit 43. In response to the twelve sets of initial position detecting signals PD, the switching circuit 41 is operated with twelve initial position detection modes, respectively, for applying a supply voltage $V_{sup}$ to a brushless DC motor M. Each of the twelve initial position detection modes is operated with a corresponding detection time, during which a motor current $I_m$ is generated to gradually increase. At an end of each corresponding detection time, the current detecting circuit 44 detects the peak value of the motor current $I_m$ and feedbacks the detecting result to the initial position detecting circuit 45. Through comparing the twelve peaks of the motor currents $I_m$ respectively generated by the twelve initial position detection modes, the initial position detecting circuit 45 selects the largest peak from the twelve peaks of the motor currents $I_m$. On a basis of the initial position detection mode that generates the largest peak of the motor current $I_m$, the initial position detecting circuit 45 determines the initial position of the rotor. Afterwards, the initial position detecting circuit 45 applies an initial position indicating signal POS to the start-up circuit 46. On a basis of the rotor's initial position indicated by the initial position indicating signal POS, the start-up circuit 46 performs a two-phase operation for driving the brushless DC motor M. At first, the start-up circuit 46 performs an open-loop control phase for driving the brushless DC motor M to reach a predetermined threshold rate of rotation. Then, the start-up circuit 46 performs a close-loop control phase for driving the brushless DC motor M to reach a target rate of rotation specified by user's commands.

In the embodiment shown in FIG. 4, the brushless DC motor M has three phase coils U, V, and W, coupled together to form a Y-shaped structure. The switching circuit 41 has three high-side switches Q1, Q3, and Q5 and three low-side switches Q2, Q4, and Q6. An input terminal A of the coil U is coupled to the supply voltage $V_{sup}$ through the high-side switch Q1, and is coupled to the ground potential through the low-side switch Q2. An input terminal B of the coil V is coupled to the supply voltage $V_{sup}$ through the high-side switch Q3, and is coupled to the ground potential through the low-side switch Q4. An input terminal C of the coil W is coupled to the supply voltage $V_{sup}$ through the high-side switch Q5, and is coupled to the ground potential through the low-side switch Q6.

The switch control circuit 43 applies a switch control signal SC to the driving circuit 42. In response to the switch control signal SC, the driving circuit 42 generates six switching signals S1 to S6 for controlling the high-side switches Q1, Q3, and Q5 and the low-side switches Q2, Q4, and Q6, respectively.

The initial position detecting circuit 45 applies in sequence twelve sets of initial position detecting signals PD to the switch control circuit 43. Each set of the initial position detecting signals PD determines a specific operation mode defined by a combination of ON/OFF states of the high-side switches Q1, Q3, and Q5 and the low-side switches Q2, Q4, and Q6, for controlling whether the input terminals A, B, and C of the three phase coils U, V, and W are coupled to the supply voltage $V_{sup}$, the ground potential, or the floating potential, i.e., being floated. Therefore, the twelve sets of the initial position detecting signals PD determine twelve initial position detection modes. As for each mode, a composite magnetic field with a different direction is generated because the motor current $I_m$ flows through the three phase coils in a different pattern of current paths.

Figure 5:
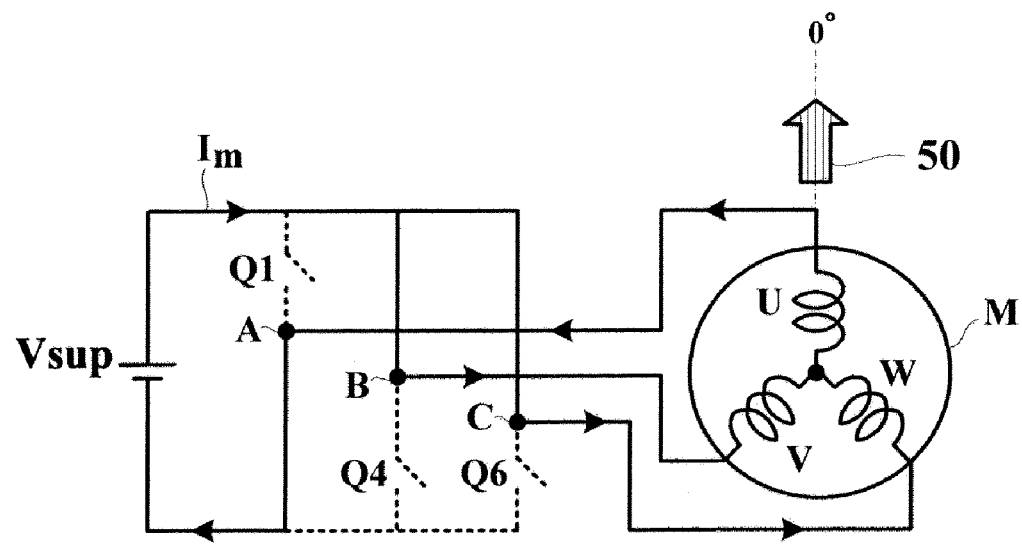
FIG. 5 is a circuit diagram showing a first initial position detection mode according to the present invention.

For example, FIG. 5 is a circuit diagram showing a first initial position detection mode according to the present invention. Since the switches Q1, Q4, and Q6 are turned OFF and the switches Q2, Q3, and Q5 are turned ON, the input terminal A is coupled to the ground potential, the input terminal B is coupled to the supply voltage $V_{sup}$, and the input terminal C is coupled to the supply voltage $V_{sup}$. At this mode, the motor current $I_m$ flows into the coils V and W through the terminals B and C and then flows out of the coil U through the terminal A, such that the composite magnetic field generated by the motor current $I_m$ has a direction as pointed by the arrow 50.

Figure 6:
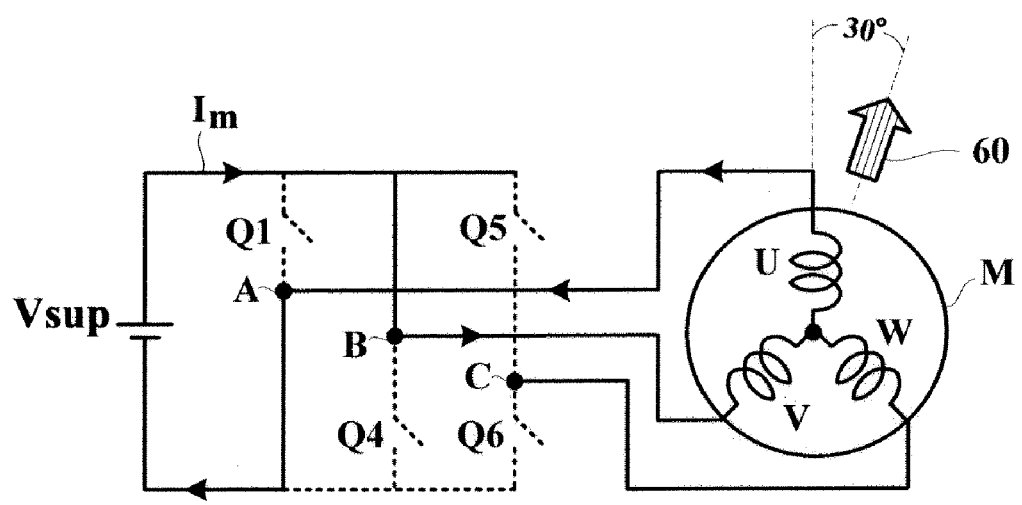
FIG. 6 is a circuit diagram showing a second initial position detection mode according to the present invention.

For example, FIG. 6 is a circuit diagram showing a second initial position detection mode according to the present invention. Since the switches Q1, Q4, Q5, and Q6 are turned OFF and the switches Q2 and Q3 are turned ON, the input terminal A is coupled to the ground potential, the input terminal B is coupled to the supply voltage $V_{sup}$, and the input terminal C is floated. At this mode, the motor current $I_m$ flows into the coil V through the terminal B and then flows out of the coil U through the terminal A, but no current flows through the coil W, such that the composite magnetic field generated by the motor current $I_m$ has a direction as pointed by the arrow 60. As apparently seen from the comparison between FIGS. 5 and 6, the arrow 60 is 30 degrees clockwise with respect to the arrow 50.

FIGS. 7(a) to 7(l) are schematic diagrams showing twelve initial position detection modes according to the present invention, respectively, determined by the twelve sets of initial position detecting signals PD. At a first initial position detection mode shown in FIG. 7(a), the coil U is coupled to the ground potential GND, the coil V is coupled to the supply voltage $V_{sup}$, and the coil W is coupled to the supply voltage $V_{sup}$. At a second initial position detection mode shown in FIG. 7(b), the coil U is coupled to the ground potential GND, the coil V is coupled to the supply voltage $V_{sup}$ and the coil W is coupled to the floating potential FLT (i.e., being floated). At a third initial position detection mode shown in FIG. 7(c), the coil U is coupled to the ground potential GND, the coil V is coupled to the supply voltage $V_{sup}$, and the coil W is coupled to the ground potential GND. At a fourth initial position detection mode shown in FIG. 7(d), the coil U is coupled to the floating potential FLT, the coil V is coupled to the supply voltage $V_{sup}$, and the coil W is coupled to the ground potential GND. At a fifth initial position detection mode shown in FIG. 7(e), the coil U is coupled to the supply voltage $V_{sup}$, the coil V is coupled to the supply voltage $V_{sup}$, and the coil W is coupled to the ground potential GND. At a sixth initial position detection mode shown in FIG. 7(f), the coil U is coupled to the supply voltage $V_{sup}$, the coil V is coupled to the floating potential FLT, and the coil W is coupled to the ground potential GND. At a seventh initial position detection mode shown in FIG. 7(g), the coil U is coupled to the supply voltage $V_{sup}$, the coil V is coupled to the ground potential GND, and the coil W is coupled to the ground potential GND. At an eighth initial position detection mode shown in FIG. 7(h), the coil U is coupled to the supply voltage $V_{sup}$, the coil V is coupled to the ground potential GND, and the coil W is coupled to the floating potential FLT. At a ninth initial position detection mode shown in FIG. 7(i), the coil U is coupled to the supply voltage $V_{sup}$, the coil V is coupled to the ground potential GND, and the coil W is coupled to the supply voltage $V_{sup}$. At a tenth initial position detection mode shown in FIG. 7(j), the coil U is coupled to the floating potential FLT, the coil V is coupled to the ground potential GND, and the coil W is coupled to the supply voltage $V_{sup}$. At an eleventh initial position detection mode shown in FIG. 7(k), the coil U is coupled to the ground potential GND, the coil V is coupled to the ground potential GND, and the coil W is coupled to the supply voltage $V_{sup}$. At a twelfth initial position detection mode shown in FIG. 7(l), the coil U is coupled to the ground potential GND, the coil V is coupled to the floating potential FLT, and the coil W is coupled to the supply voltage $V_{sup}$.

Figure 7A:
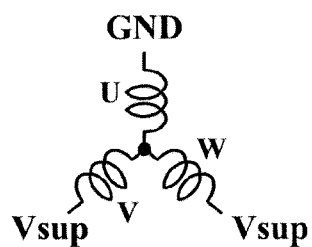
FIGS. 7(a) to 7(l) are schematic diagrams showing twelve initial position detection modes according to the present invention, respectively.
Figure 7B:
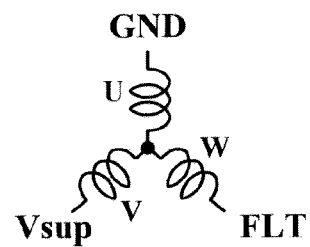
Figure 7C:
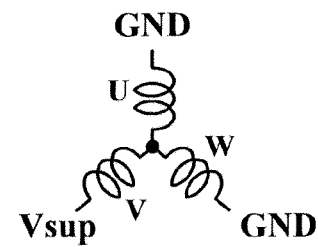
Figure 7D:
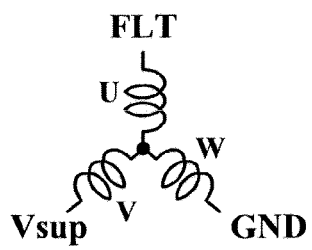
Figure 7E:
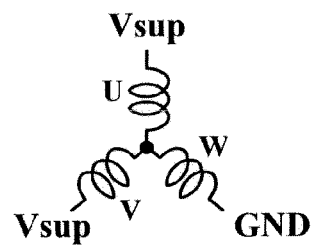
Figure 7F:
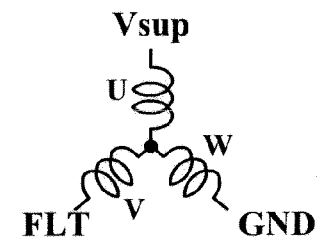
Figure 7G:
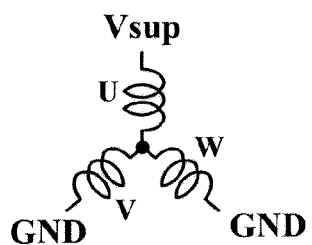
Figure 7H:
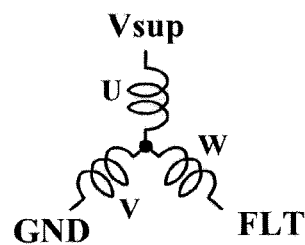
Figure 7I:
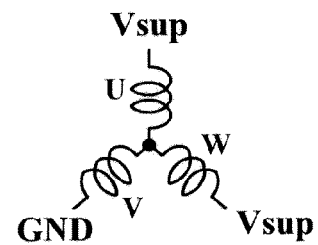
Figure 7J:
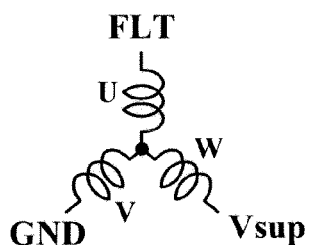
Figure 7K:
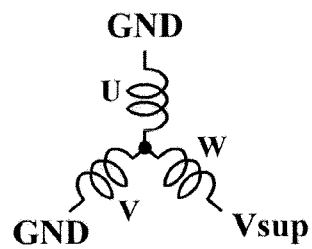
Figure 7L:
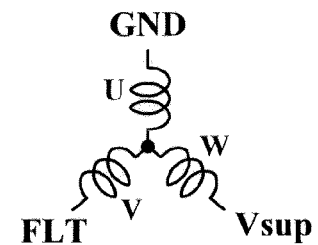

If the composite magnetic field generated by the first initial position detection mode shown in FIG. 7(a) has a direction referred to as 0 degree of electrical angle, then the composite magnetic fields generated by the second to twelfth initial position detection modes shown in FIGS. 7(b) to 7(l) have directions referred to as 30, 60, 90, 120, 150, 180, 210, 240, 270, 300, and 330 degrees of electrical angle, respectively. In other words, the composite magnetic fields generated by any two adjacent modes of the twelve initial position detection modes have the directions with a difference of 30 degrees of electrical angle with respect one another.

For each of the initial position detection modes, the different direction of the composite magnetic field causes a different equivalent inductance of the motor coils, as described above with reference to FIG. 2, and therefore the increasing rate of the motor current $I_m$ changes in accordance with the different equivalent inductance of the motor coils. When the composite magnetic field of the coils and the permanent magnet's field of the rotor become closer to the same direction, the equivalent inductance of the motor coils becomes smaller. The smaller the equivalent inductance of the motor coils becomes, the larger the peak is reached by the motor current $I_m$ at an end of the corresponding detection time of the initial position detection mode.

Referring back to FIG. 4, the sensorless start-up control circuit 40 is provided with the current detecting circuit 44, coupled to the switching circuit 41, for detecting the motor current $I_m$. For example, the current detecting circuit 44 may be implemented by a resistor $R_{sen}$ coupled in series between the commonly-connecting point of the low-side switches Q2, Q4, and Q6 of the switching circuit 41 and the ground potential. Therefore, a potential difference generated by the motor current $I_m$ flowing through the resistor $R_{sen}$ may be used as a current detection signal DI for being applied to the initial position detection circuit 45.

Figure 8:
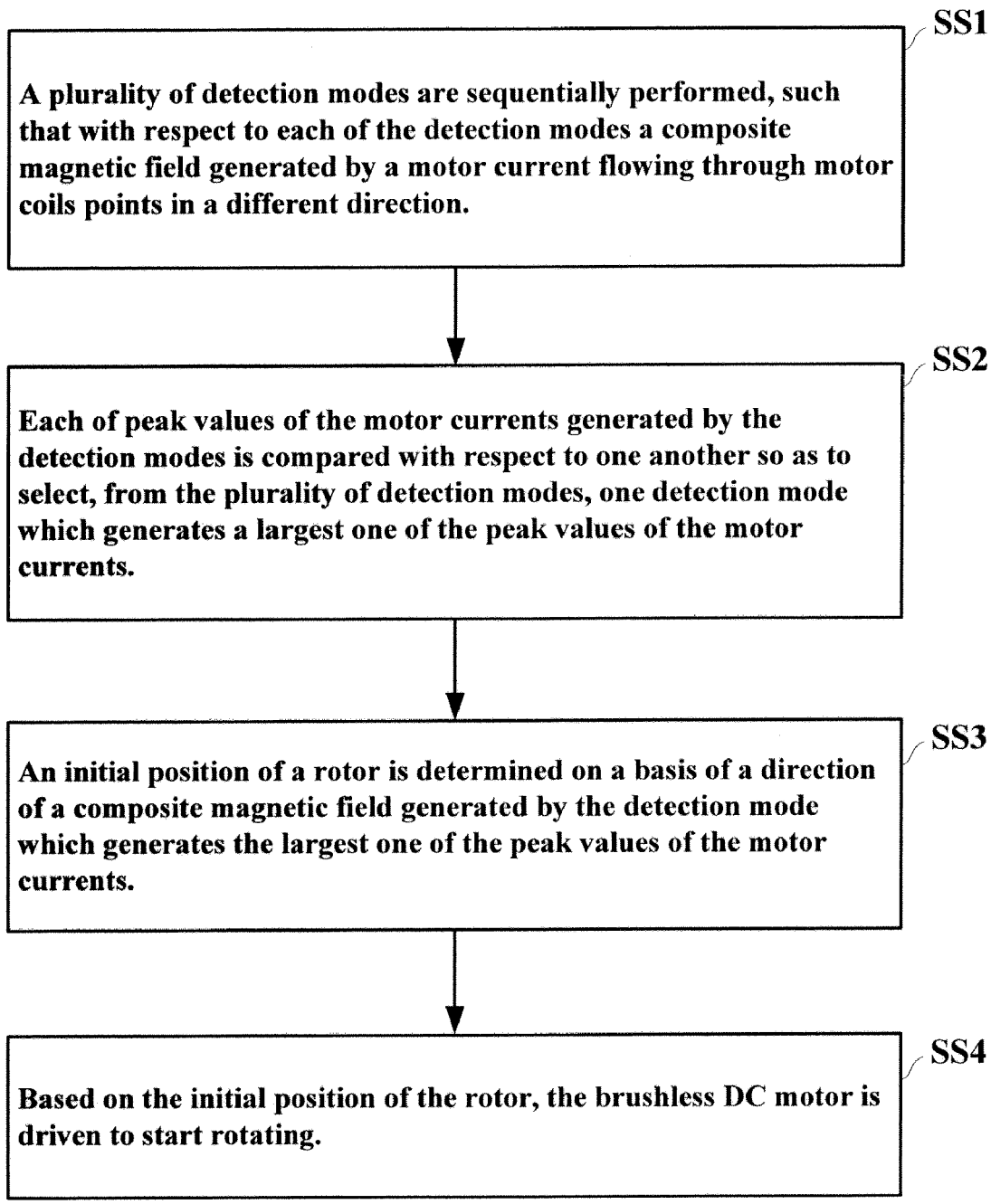
FIG. 8 is a flow chart showing a sensorless start-up method for driving a brushless DC motor according to the present invention.

Hereinafter is described in detail a sensorless start-up method for driving a brushless DC motor according to the present invention with reference to FIG. 8. In a step SS1, a plurality of detection modes are sequentially performed, such that with respect to each of the detection modes a composite magnetic field generated by a motor current flowing through motor coils points in a different direction. Each mode is performed to last for a corresponding detection time such that the motor current gradually increases to a peak value at an end of the corresponding detection time. In a step SS2, each of the peak values of the motor currents generated by the detection modes is compared with respect to one another so as to select, from the plurality of detection modes, one detection mode which generates a largest one of the peak values of the motor currents. In a step SS3, an initial position of a rotor is determined on a basis of a direction of a composite magnetic field generated by the detection mode which generates the largest one of the peak values of the motor currents. In a step SS4, based on the initial position of the rotor, the brushless DC motor is driven to start rotating.

Figure 9:
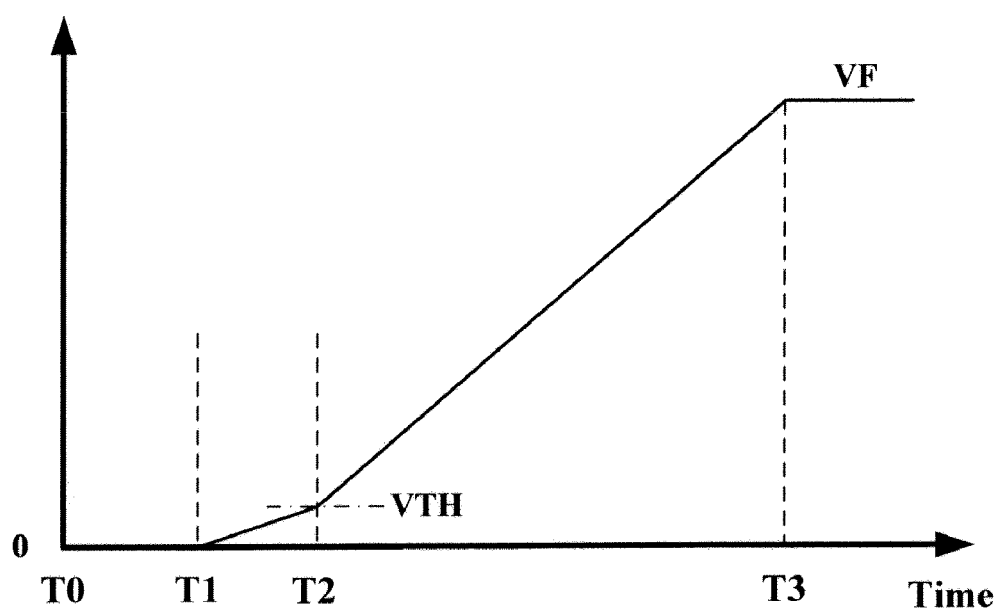
FIG. 9 is a chart showing a variation of a rate of rotation of a brushless DC motor during an initial position detection phase, an open-loop control phase, and a close-loop control phase according to the present invention.

FIG. 9 is a chart showing a variation of a rate of rotation of a brushless DC motor during an initial position detection phase, an open-loop control phase, and a close-loop control phase according to the present invention. Referring to FIG. 9, the sensorless start-up method for driving the brushless DC motor according to the present invention includes: an initial position detection phase, an open-loop control phase, and a close-loop control phase. From time T0 to T1, the initial position detection phase is used for detecting the initial position of the rotor. During the initial position detection phase, the rate of rotation of the rotor is kept zero, i.e., the rotor is static. From time T1 to T2, the open-loop control phase is used for driving the rotor in accordance with the initial position of the rotor, such that the rate of rotation of the rotor gradually increases to reach a predetermined threshold rate VTH. From time T2 to T3, the close-loop control phase is used for driving the rotor such that the rate of rotation of the rotor gradually increases from the predetermined threshold rate VTH to reach a target rate VF specified by user's commands.

As described above, the sensorless start-up method for driving the brushless DC motor according to the present invention includes a step of determining an initial position of a rotor by comparing the peak values of the motor currents generated by the twelve detection modes with respect to one another so as to select, from the twelve detection modes, one detection mode which generates a largest one of the peak values of the motor currents. In order to expand the relative difference between the peaks of the motor currents $I_m$ generated by the detection modes so as to enhance the accuracy of the initial position detection, it seems better for each mode to last for a longer corresponding detection time. As for any two first-order RL systems, if two system time constants are similar, then the current responses of the two systems generate the largest difference under a condition that the period for applying the DC voltage signal is set equal to the system time constant. But if the system time constant is too large such that the period for applying the DC voltage signal becomes too long, the motor current reaches a high enough level for causing the motor to start rotating. For this reason, the corresponding detection time of each position detection mode should be limited within a range that prevents the rotor from rotating since the rotor is required to remain static during the initial position detection phase according to the present invention.

The twelve initial position detection modes may be categorized into two groups. The first group consists of the detection modes shown in FIGS. 7(a), 7(c), 7(e), 7(g), 7(i), and 7(k), with the same structural characteristic that any two phase coils are coupled in parallel and then together coupled in series to the remaining phase coil. As a result, the motor coils in the first group provide an equivalent resistance of 1.5*R and an equivalent inductance of 1.5*L wherein L represents the equivalent inductance of any one of the motor coils and R represents the equivalent resistance of any one of the motor coils. The second group consists of the detection modes shown in FIGS. 7(b), 7(d), 7(f), 7(h), 7(j), and 7(l), with the same structural characteristic that any two phase coils are coupled in series and the remaining phase coil is floated. As a result, the motor coils in the second group provide an equivalent resistance of 2*R and an equivalent inductance of 2*L. Therefore, the first group has a current response $i_{G1}(t)$ as shown in Equation (1) and the second group has a current response $i_{G2}(t)$ as shown in Equation (1):

$$i_{G1}(t) = \frac{V_{sup}}{1.5R}\left(1 - e^{-(\frac{R}{L})t}\right) \quad (1)$$

$$i_{G2}(t) = \frac{V_{sup}}{2R}\left(1 - e^{-(\frac{R}{L})t}\right) \quad (2)$$

In order to eliminate the unfairness due to the difference between the equivalent inductances and resistances of the first and second groups, the detection time $T_{G1}$ applied in the first group and the detection time $T_{G2}$ applied in the second group must satisfy Equation (3):

$$i_{G1}(T_{G1}) = i_{G2}(T_{G2}) \quad (3)$$

From Equation (3) is derived Equation (4):

$$T_{G2} = -\left(\frac{L}{R}\right)\ln\left(\frac{4e^{(-(\frac{R}{L})T_{G1})} - 1}{3}\right) \quad (4)$$

Therefore, after the detection time $T_{G1}$ applied in the first group is chosen, the detection time $T_{G2}$ applied in the second group is determined in accordance with Equation (4).

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A sensorless start-up method for driving a brushless DC motor, comprising:
   performing a plurality of detection modes in sequence, such that with respect to each of the detection modes a composite magnetic field generated by a motor current flowing through motor coils points in a different direction, wherein each mode is performed to last for a corresponding detection time such that the motor current gradually increases to a peak value at an end of the corresponding detection time;
   comparing each of the peak values of the motor currents generated by the detection modes with respect to one another so as to select, from the plurality of detection modes, one detection mode which generates a largest one of the peak values of the motor currents;
   determining an initial position of a rotor on a basis of a direction of a composite magnetic field generated by the detection mode which generates the largest one of the peak values of the motor currents; and
   driving the brushless DC motor to start rotating based on the initial position of the rotor,
   wherein:
   the corresponding detection time of each of the odd-numbered detection modes is implemented by a first group detection time ($T_{G1}$);

the corresponding detection time of each of the even-numbered detection modes is implemented by a second group detection time ($T_{G2}$); and the first group detection time ($T_{G1}$) and the second group detection time ($T_{G2}$) satisfy an equation as follows:

$$T_{G2} = -\left(\frac{L}{R}\right)\ln\left(\frac{4e^{(-(\frac{R}{L})T_{G1})} - 1}{3}\right)$$

wherein L represents an equivalent inductance of any of the motor coils and R represents an equivalent resistance of any of the motor coils.

2. The sensorless start-up method according to claim 1, wherein:

the plurality of detection modes include twelve detection modes for generating twelve composite magnetic fields, respectively, any adjacent two of which have a difference of 30 degrees in direction.

3. The sensorless start-up method according to claim 2, wherein:

the motor coils include a first phase coil, a second phase coil, and a third phase coil, coupled together to form a Y-shaped structure.

4. The sensorless start-up method according to claim 3, wherein:

at a first detection mode of the twelve detection modes, an input terminal of the first phase coil is coupled to a ground potential, an input terminal of the second phase coil is coupled to a supply voltage, and an input terminal of the third phase coil is coupled to the supply voltage;

at a second detection mode of the twelve detection modes, the input terminal of the first phase coil is coupled to the ground potential, the input terminal of the second phase coil is coupled to the supply voltage, and the input terminal of the third phase coil is floated;

at a third detection mode of the twelve detection modes, the input terminal of the first phase coil is coupled to the ground potential, the input terminal of the second phase coil is coupled to the supply voltage, and the input terminal of the third phase coil is coupled to the ground potential;

at a fourth detection mode of the twelve detection modes, the input terminal of the first phase coil is floated, the input terminal of the second phase coil is coupled to the supply voltage, and the input terminal of the third phase coil is coupled to the ground potential;

at a fifth detection mode of the twelve detection modes, the input terminal of the first phase coil is coupled to the supply voltage, the input terminal of the second phase coil is coupled to the supply voltage, and the input terminal of the third phase coil is coupled to the ground potential;

at a sixth detection mode of the twelve detection modes, the input terminal of the first phase coil is coupled to the supply voltage, the input terminal of the second phase coil is floated, and the input terminal of the third phase coil is coupled to the ground potential;

at a seventh detection mode of the twelve detection modes, the input terminal of the first phase coil is coupled to the supply voltage, the input terminal of the second phase coil is coupled to the ground potential, and the input terminal of the third phase coil is coupled to the ground potential;

at an eighth detection mode of the twelve detection modes, the input terminal of the first phase coil is coupled to the supply voltage, the input terminal of the second phase coil is coupled to the ground potential, and the input terminal of the third phase coil is floated;

at a ninth detection mode of the twelve detection modes, the input terminal of the first phase coil is coupled to the supply voltage, the input terminal of the second phase coil is coupled to the ground potential, and the input terminal of the third phase coil is coupled to the supply voltage;

at a tenth detection mode of the twelve detection modes, the input terminal of the first phase coil is floated, the input terminal of the second phase coil is coupled to the ground potential, and the input terminal of the third phase coil is coupled to the supply voltage;

at an eleventh detection mode of the twelve detection modes, the input terminal of the first phase coil is floated, the input terminal of the second phase coil is coupled to the ground potential, and the input terminal of the third phase coil is coupled to the supply voltage; and at a twelfth detection mode of the twelve detection modes, the input terminal of the first phase coil is coupled to the ground potential, the input terminal of the second phase coil is floated, and the input terminal of the third phase coil is coupled to the supply voltage.

* * * * *